(No Model.)
J. B. SWEET.
VEHICLE BRAKE.
No. 489,997. Patented Jan. 17, 1893.
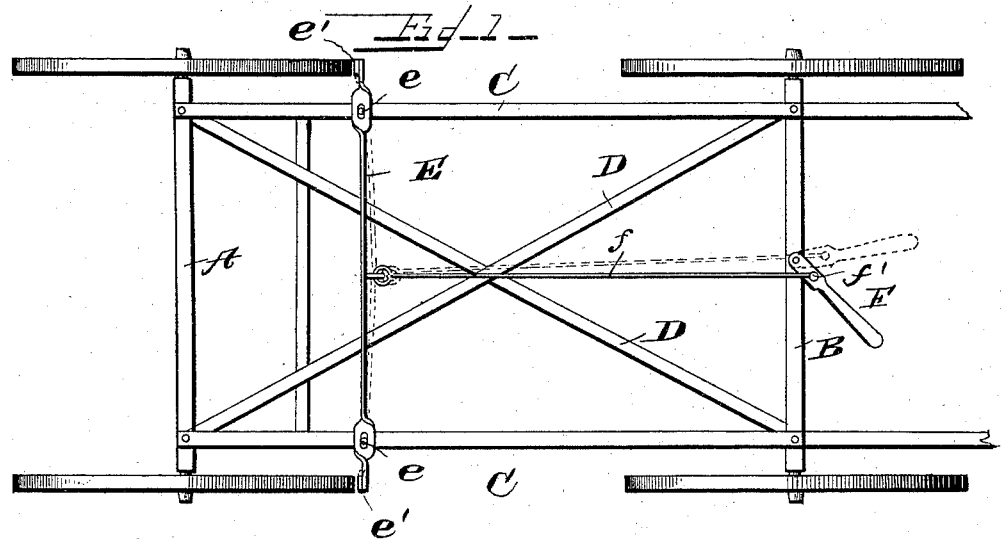
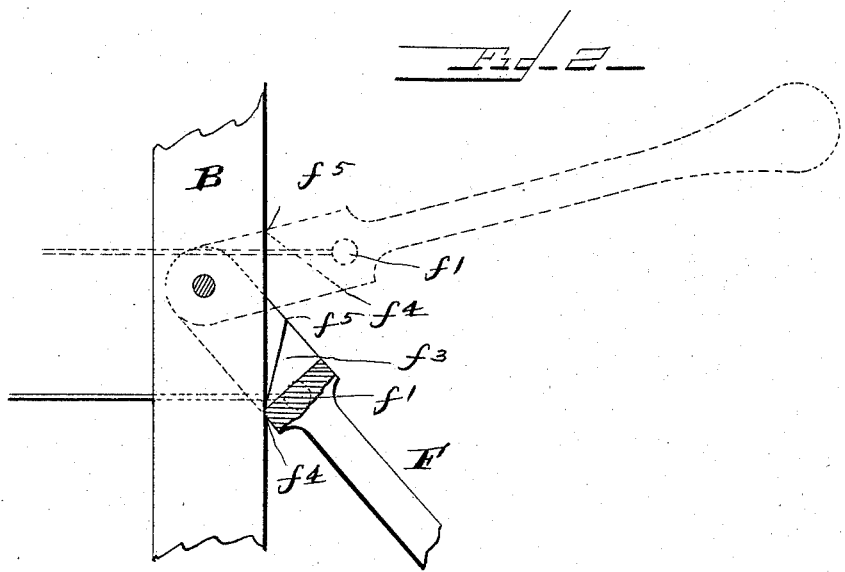
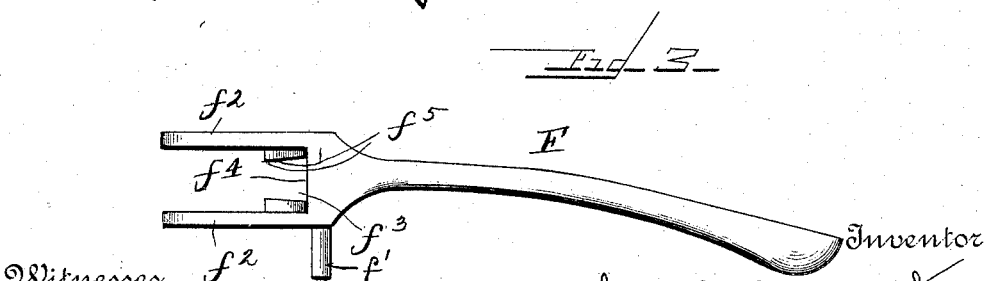
Witnesses
G. A. Vanbuschmidt
Jene Kingsbury
Inventor
Joseph B. Sweet
By Whitaker & Prevost
Attorneys

UNITED STATES PATENT OFFICE.

JOSEPH B. SWEET, OF BUFFALO, NEW YORK.

VEHICLE-BRAKE.

SPECIFICATION forming part of Letters Patent No. 489,997, dated January 17, 1893.

Application filed September 3, 1892. Serial No. 444,979. (No model.)

*To all whom it may concern:*

Be it known that I, JOSEPH B. SWEET, a citizen of the United States, residing at Buffalo, in the county of Erie and State of New York, have invented certain new and useful Improvements in Vehicle-Brakes; and I do hereby declare the following to be a full, clear, and exact description of the invention, such as will enable others skilled in the art to which it appertains to make and use the same.

My invention is an improvement in vehicle brakes and consists in the novel features of construction and combination of parts hereinafter described reference being had to the accompanying drawings which illustrate one form in which I have contemplated embodying my invention, and I have fully disclosed my said invention in the following description and claims.

Referring to said drawings: Figure 1 is a bottom plan view of the running gear of a vehicle with my improved brake applied thereto. Fig. 2 represents a top plan view partly in section, of the operating lever secured to the rear axle. Fig. 3 is a side elevation of said lever.

In the drawings I have shown my improved brake adapted and applied to the running gear of a baby carriage or other light vehicle but it will be understood that it may be applied to any kind of a vehicle to which it may be conveniently applied.

In the drawings A represents the front axle and B the rear axle connected by the side rails C C and suitable brace bars D D.

E is the brake beam which is formed in one piece, of spring material such as wood, steel, &c. and is provided with suitable slots $e$ $e$ through which extend bolts $c$ $c$ which secure it to the side rails of the running gear, but allow a slight amount of play at the points of connection.

I prefer to form the brake beam of steel disposed on edge in a vertical position and to twist portions of said beam into a horizontal position as shown where it engages the side rails.

It is obvious that instead of securing the brake beam to the side rails C C it might be secured to the under side of the vehicle body if desired. The outer ends of the beam E which I term the spring brake beam are ordinarily provided with suitable brake shoes $e'$ $e'$ of wood, leather or other preferred material for engaging in this instance the wheels $a$ $a$ of the front axle. But it will be understood that the brake might be arranged to operate in connection with rear wheels if preferred.

At or near the center of the beam E a link or rod $f$ is connected thereto and it will be seen that by drawing the center of the beam rearwardly the brake shoes will be moved forwardly into engagemement with the wheels, the slotted connections and the elasticity of the beam permitting this to be accomplished. I also provide suitable means for operating the brake beam. In this instance I have shown a lever F pivotally connected to the rear axle (or it may be pivoted to some other portion of the frame of the vehicle if preferred) which is provided with a pivot pin $f'$ to which one end of the link $f$ is connected. The axle engaging end of the lever F is preferably forked as shown to provide two arms $f^2$ $f^2$ which are pivoted to said axle, and at the inner ends of said arms are a pair of inclined lugs $f^3$ each of which provide two shoulders or vertical edges $f^4$ $f^5$ as shown in Figs. 2 and 3. When the lever is in the position to release the brake, as shown in full lines Figs. 1 and 2, the shoulders $f^4$ rest against the rear face of the axle. When it is desired to set the brake, the lever F is moved to the right until the pin $f'$ moves past the line of center of the pivot of said lever and the shoulder $f^5$ engages the axle. This draws the link rearwardly and sets the brake as before described and at the same time by reason of the construction just described the parts are locked rigidly in that position, as the tension upon the link $f$ will hold the shoulders $f^5$ firmly against the axle. When the lever F is thrown to the left the brake will be thrown off instantly, the spring beam E straightening itself and removing the shoes from engagement with the wheels. This locking construction of the brake operating devices will be found very desirable when the brake is applied to baby carriages, as by a simple movement of the lever the brake can be instantly applied and the parts locked so that the carriage will remain stationary until the lever is thrown in the opposite direction.

What I claim and desire to secure by Letters Patent is:—

1. The combination with the brake beam composed of spring material, of rigid supports engaging the same adjacent to its ends, and operating devices connected to said beam between its supports for moving it in a direction away from the wheels, whereby the portions of said beam outside of said supports will be moved toward the wheels, substantially as described.

2. The combination with the brake beam composed of spring material supports engaging the same, adjacent to its ends, slotted connections between said beam and said supports and devices for operating said beam, connected to the same intermediate said supports, substantially as described.

3. The combination with the brake beam composed of spring material supports engaging the same adjacent to its ends, shoes on said beam on the portions of the same outside of said supports, and devices for operating the beam connected thereto intermediate said supports, substantially as described.

4. The combination with the brake beam composed of spring material, supported adjacent to its ends, of the pivoted operating lever, a link connecting said lever with the brake beam intermediate said supports, said lever being provided with locking shoulders, substantially as described.

5. The combination with the brake beam composed of spring material disposed vertically, and having portions adjacent to its ends bent into a horizontal plane for engaging its supports, the wheel engaging portions of said beam being located outside of said supports and operating devices for said brake beam connected to the same intermediate its supports, substantiallly as described.

In testimony whereof I affix my signature in presence of two witnesses.

JOSEPH B. SWEET.

Witnesses:
  W. O. DUTTON,
  WM. J. RICHARDSON.